United States Patent
Cropper et al.

(10) Patent No.: US 10,015,051 B2
(45) Date of Patent: *Jul. 3, 2018

(54) DYNAMIC AGGRESSIVENESS FOR OPTIMIZING PLACEMENT OF VIRTUAL MACHINES IN A COMPUTING ENVIRONMENT

(71) Applicant: International Business Machines Corporation, Armonk, NY (US)

(72) Inventors: Joseph W. Cropper, Rochester, MN (US); Jennifer D. Mulsow, Cedar Park, TX (US); Taylor D. Peoples, Austin, TX (US); Edward Shvartsman, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/403,103

(22) Filed: Jan. 10, 2017

(65) Prior Publication Data

US 2017/0149611 A1    May 25, 2017

Related U.S. Application Data

(63) Continuation of application No. 15/057,213, filed on Mar. 1, 2016, now Pat. No. 9,600,303, which is a *H04L 41/0806* (2013.01); *H04L 41/0816* (2013.01); *H04L 67/1008* (2013.01)

(51) Int. Cl.
*G06F 9/455* (2018.01)
*H04L 12/24* (2006.01)
*H04L 29/08* (2006.01)

(52) U.S. Cl.
CPC ...... *H04L 41/0893* (2013.01); *G06F 9/45504* (2013.01); *H04L 41/083* (2013.01);
(Continued)

(58) Field of Classification Search
None
See application file for complete search history.

(56) References Cited

U.S. PATENT DOCUMENTS 8,694,644 B2    4/2014   Chen et al.
2013/0097296 A1  4/2013  Gehrmann et al.
(Continued)

OTHER PUBLICATIONS

Cropper et al., "Dynamic Aggressiveness for Optimizing Placement of Virtual Machines in a Computing Environment" U.S. Appl. No. 14/872,284, filed Oct. 1, 2015.
(Continued)

*Primary Examiner* — Gregory A Kessler
(74) *Attorney, Agent, or Firm* — Martin & Associates, LLC; Bret J. Petersen

(57) ABSTRACT

Dynamically changing the aggressiveness of optimization of virtual machines on physical hosts allows more efficient and varied optimization. An aggressiveness policy mechanism periodically applies system conditions to the aggressiveness policies to create aggressiveness settings that are provided to an optimizer. The optimizer then uses the aggressiveness settings to dynamically adjust the aggressiveness of placement of virtual machines according to the aggressiveness settings and consistent with other optimization policies. The aggressiveness policy mechanism may allow a system administrator to create and/or select aggressiveness policies.

19 Claims, 7 Drawing Sheets

Related U.S. Application Data continuation of application No. 14/872,284, filed on Oct. 1, 2015, now Pat. No. 9,594,577.

(56) References Cited

U.S. PATENT DOCUMENTS

| | | |
|---|---|---|
| 2014/0207944 A1 | 6/2014 | Emaru |
| 2015/0006734 A1 | 1/2015 | Parikh et al. |
| 2015/0058641 A1 | 2/2015 | Parikh |
| 2015/0163157 A1 | 6/2015 | Hao et al. |
| 2015/0242273 A1 | 8/2015 | Resche |

OTHER PUBLICATIONS

Cropper et al., "Dynamic Aggressiveness for Optimizing Placement of Virtual Machines in a Computing Environment" U.S. Appl. No. 15/057,213, filed Mar. 1, 2016.

Cropper et al., "Dynamic Aggressiveness for Optimizing Placement of Virtual Machines in a Computing Environment" U.S. Appl. No. 15/401,802, filed Jan. 9, 2017.

Appendix P—List of IBM Patents or Patent Applications Treated as Related, dated Mar. 1, 2017.

Wood et al., "Sandpiper: Black-box and gray-box resource management for virtual machines", Computer Networks 53, No. 17, p. 2923-2938, Dec. 2009.

Gutierrez-Garcia et al., "Policy-based Agents for Virtual Machine Migration in Cloud Data Centers", IEEE 10th International Conference on Services Computing, p. 603-610, 2013.

VMware, "DRS Migration Threshold", available at https://pubs.vmware.com/vsphere-4-esx-vcenter/index.jsp?topic=/com.vmware.vsphere.resourcemanagement.doc_40/creating_a_drs_cluster/c_migration_threshold.html, printed Sep. 30, 2015.

Microsoft System Center, "How to Configure Dynamic Optimization and Power Optimization in VMM", available at https://technet.microsoft.com/en-us/library/gg675118.aspx, 2012.

Hornbeck, J.C., Dynamic Optimization and Power Optimization in SCVMM 2012, System Center: Virtual Machine Manager Engineering Blog, available at https://technet.microsoft.com/en-us/library/gg675118.aspx, May 4, 2011.

DYNAMIC AGGRESSIVENESS FOR OPTIMIZING PLACEMENT OF VIRTUAL MACHINES IN A COMPUTING ENVIRONMENT

BACKGROUND

1. Technical Field

This invention generally relates to virtual machines in a computing environment, and more specifically relates to dynamically optimizing placement of virtual machines on physical hosts in a computing environment using one or more policies that define aggressiveness settings for the optimizer.

2. Background Art

Cloud computing is a common expression for distributed computing over a network and can also be used with reference to network-based services such as Infrastructure as a Service (IaaS). IaaS is a cloud based service that provides physical processing resources to run virtual machines (VMs) as a guest for different customers. The virtual machine may host a user application or a server.

A computing environment, such as a cloud computing environment, may have a large number of physical machines that can each host one or more virtual machines. Prior art cloud management tools allow a system administrator to assist in determining a specific physical host in which to place or deploy a new virtual machine. After deployment, the cloud management tools optimize the system by moving one or more virtual machines to a different physical host. The placement of the new virtual machine initially and during optimization may be determined by a placement policy selected by the system administrator. Prior art placement policies include fixed aggressiveness policies that define limited settings for aggressiveness of optimization.

BRIEF SUMMARY

An apparatus and method dynamically changes aggressiveness used to optimize placement of virtual machines on physical hosts to allow more efficient and varied optimization. An aggressiveness policy mechanism periodically applies system conditions to the aggressiveness policies to create aggressiveness settings that are provided to an optimizer. The optimizer then uses the aggressiveness settings to dynamically adjust the aggressiveness of placement of virtual machines according to the aggressiveness settings and consistent with other optimization policies. The aggressiveness policy mechanism may allow a system administrator to create and/or select aggressiveness policies.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
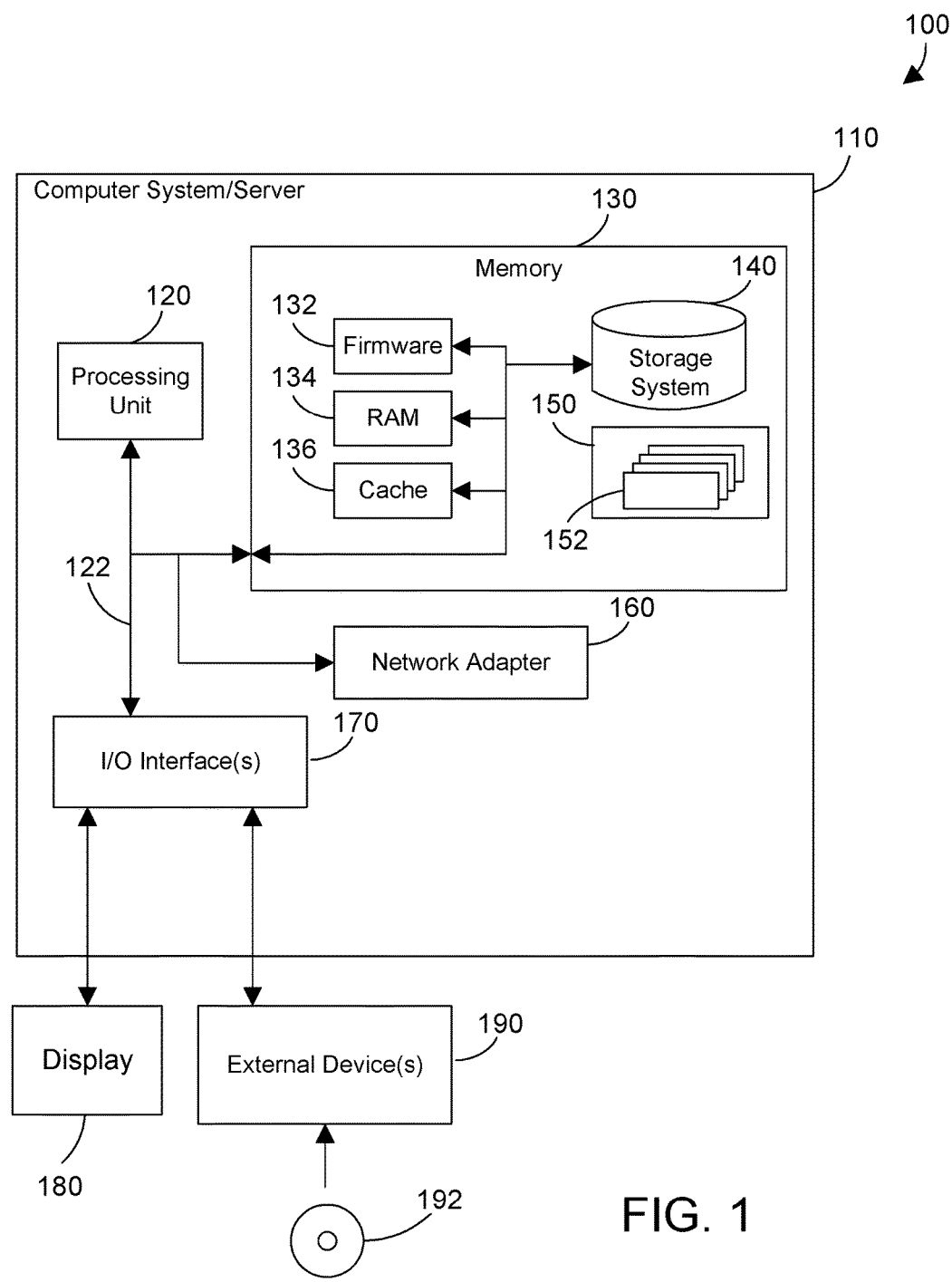
FIG. 1 is a block diagram of a cloud computing node.

The claims and disclosure herein describe dynamically changing aggressiveness used to optimize placement of virtual machines on physical hosts to allow more efficient and varied optimization. An aggressiveness policy mechanism periodically applies system conditions to the aggressiveness policies to create aggressiveness settings that are provided to an optimizer. The optimizer then uses the aggressiveness settings to dynamically adjust the aggressiveness of placement of virtual machines according to the aggressiveness settings and consistent with other optimization policies. The aggressiveness policy mechanism may allow a system administrator to create and/or select aggressiveness policies.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processor 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media.

System memory 130 can include computer system readable media in the form of volatile, such as random access memory (RAM) 134, and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, RAID systems, tape drives, data archival storage systems, etc.

Figure 2:
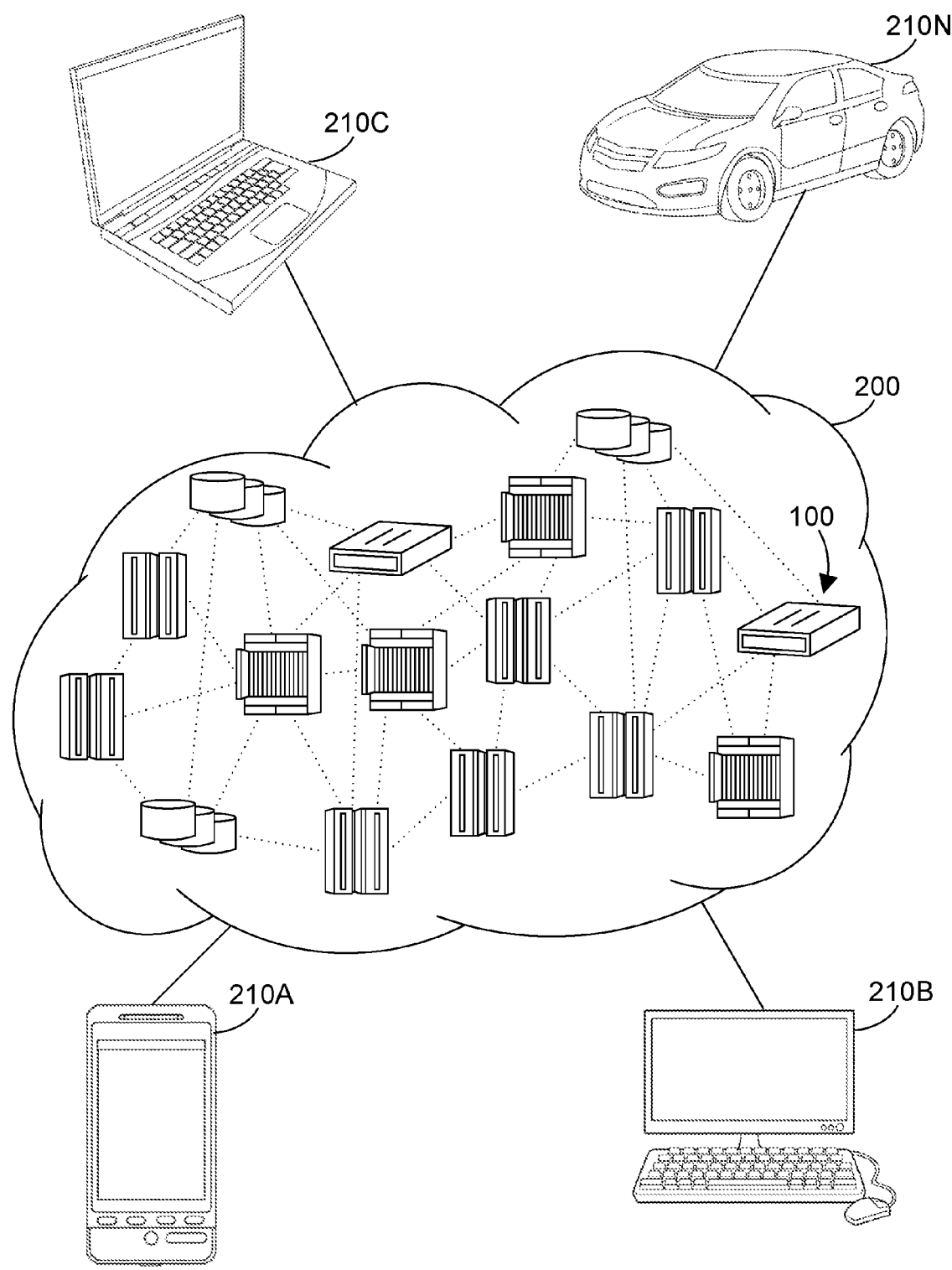
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
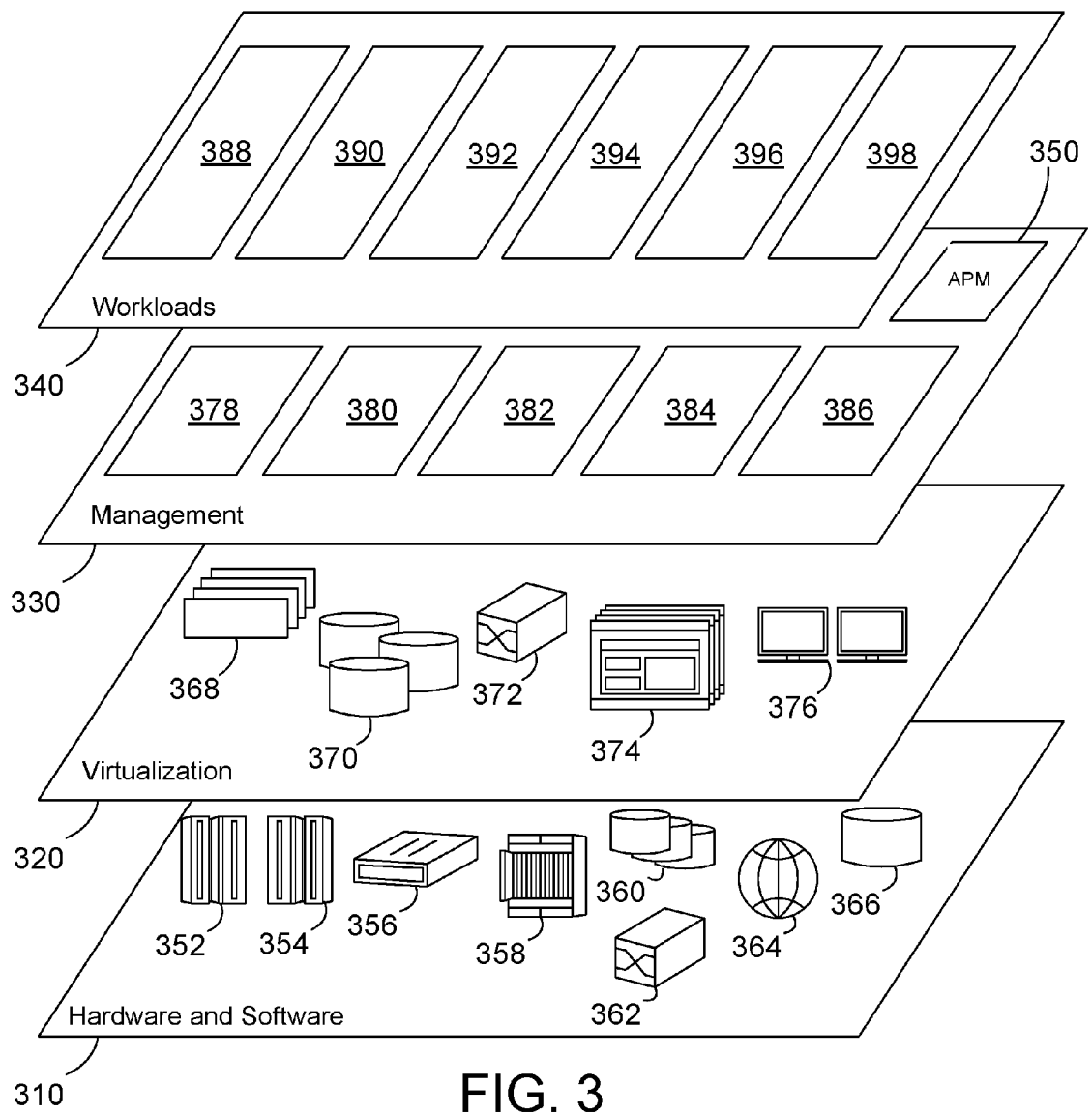
FIG. 3 is a block diagram of abstraction model layers.

Referring now to FIG. 3, a set of functional abstraction layers provided by cloud computing environment 200 (FIG. 2) is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes 352; RISC (Reduced Instruction Set Computer) architecture based servers 354; servers 356; blade servers 358; storage devices 360; and networks and networking components 362. In some embodiments, software components include network application server software 364 and database software 366.

Virtualization layer 320 provides an abstraction layer from which the following examples of virtual entities may be provided: virtual servers 368; virtual storage 370; virtual networks 372, including virtual private networks; virtual applications and operating systems 374; and virtual clients 376.

In one example, management layer 330 may provide the functions described below. Resource provisioning 378 provides dynamic procurement of computing resources and other resources that are utilized to perform tasks within the cloud computing environment. Metering and Pricing 380 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 382 provides access to the cloud computing environment for consumers and system administrators. Service level management 384 provides cloud computing resource allocation and management such that required service levels are met. Service Level Agreement (SLA) planning and fulfillment 386 provide pre-arrangement for, and procurement of, cloud computing resources for which a future requirement is anticipated in accordance with an SLA. The management layer further includes an aggressiveness policy mechanism (APM) 350 as described herein. While the APM 350 is shown in FIG. 3 to reside in the management layer 330, the APM 350 actually may span other levels shown in FIG. 3 as needed.

Workloads layer 340 provides examples of functionality for which the cloud computing environment may be utilized. Examples of workloads and functions which may be provided from this layer include: mapping and navigation 386; software development and lifecycle management 390; virtual classroom education delivery 392; data analytics processing 394; transaction processing 396 and mobile desktop 398.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
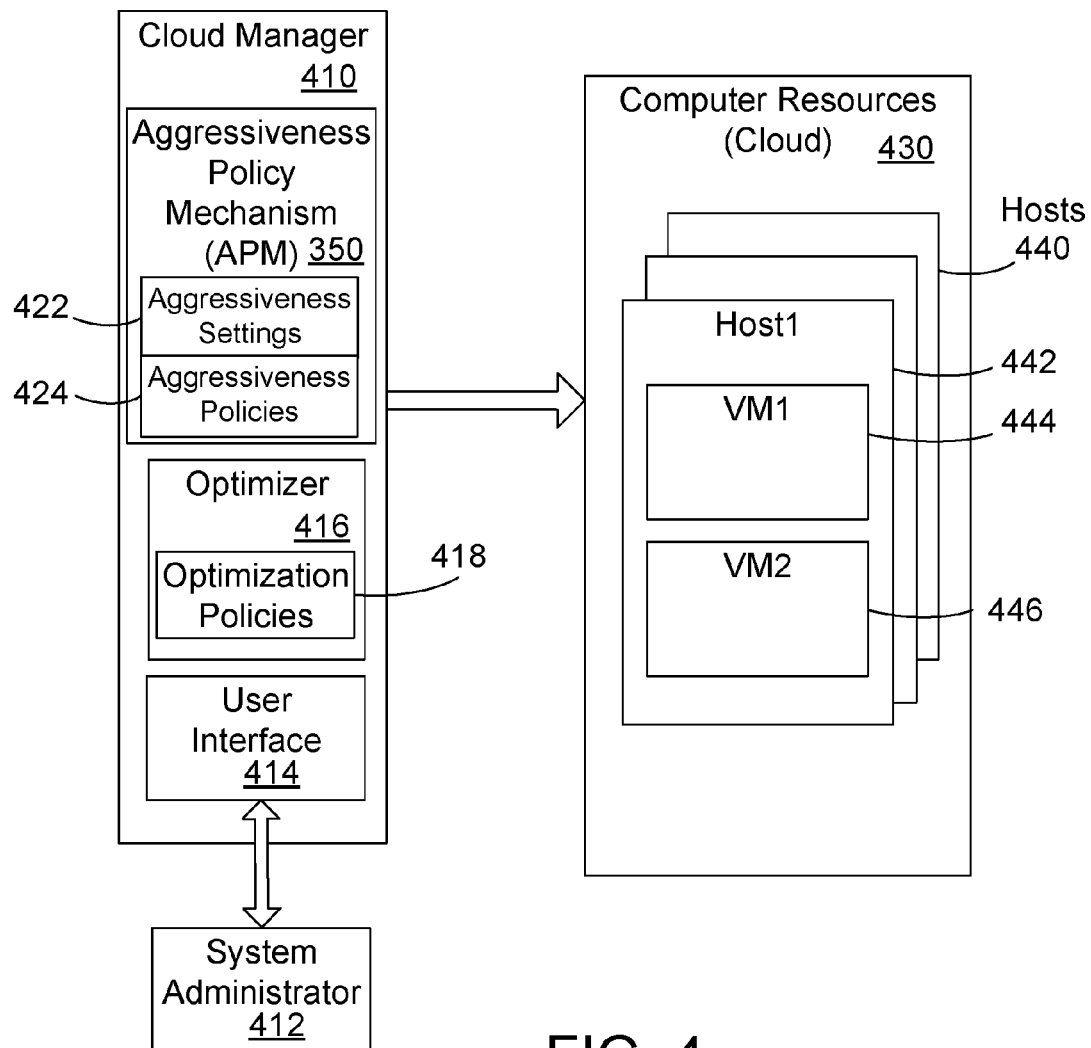
FIG. 4 is a block diagram that illustrates a computer system with an aggressiveness policy mechanism as described herein that provides dynamic aggressiveness in optimizing placement of virtual machines on physical hosts.

Referring now to FIG. 4, a block diagram illustrates a aggressiveness policy mechanism (APM) 350 that was introduced above with reference to FIG. 3. The APM 350 dynamically changes aggressiveness for optimizing placement of virtual machines on physical hosts. In the illustrated example, the APM 350 is part of a cloud manager 410. The cloud manager 410 may be similar to cloud managers known in the prior art but includes the additional features of the aggressiveness policy mechanism 350 as described herein. The cloud manager 410 allows a human user or system administrator 412 to set up and manage computer resources through a user interface 414. The cloud manager 410 implements the cloud management functions 330 described above with reference to FIG. 3. The aggressiveness policy mechanism 350 may be incorporated into the scheduler (not shown) which manages migration of VMs to physical hosts as known in the prior art.

Again referring to FIG. 4, the cloud manager 410 includes an optimizer 416. The optimizer 416 determines an optimum location for the placement of virtual machines for load balancing and other needs of the system. The optimizer 416 may operate similarly to prior art optimizers except as described herein. The optimizer 416 monitors VM and host performance and allows the scheduler (not shown) to migrate VMs to other hosts according to optimization policies 418 set by the system administrator 412. The optimization policies 418 are policies as known in the prior art to optimize placement of the virtual machines on hosts 440 in the computer resources 430.

Referring again to FIG. 4, the cloud manager 410 allows the system administrator 412 to set up and manage physical computer resources 430. Computer resources 430 represent physical computer resources such as a physical host computer system in a cloud computing environment. A set of computer resources managed as a group is sometimes referred to as a "cloud". In the illustrated example, the computer resources (or cloud) 430 includes one or more physical computer hosts 440. The physical computer hosts 440 may be located remotely from the cloud manager. A host is a physical computer accessible over a network to the cloud manager. A host has a hypervisor (software) that allows the host to run one or more virtual machines as known in the prior art. As shown in FIG. 4, computer resources 430 include one or more hosts 440 which includes host1 442. In this example, host1 442 has two virtual machines, namely: VM1 444 and VM2 446.

As introduced above, the aggressiveness policy mechanism 350 dynamically changes aggressiveness for optimizing placement of virtual machines on physical hosts. In the illustrated example in FIG. 4, the aggressiveness policy mechanism (APM) 350 includes aggressiveness settings 422 and aggressiveness policies 424. The aggressiveness settings 422 and aggressiveness policies 424 may be stored in memory with the APM 350 or any memory associated with or accessible to the cloud manager 410. The APM 350 processes the aggressiveness policies 424 to set or modify the aggressiveness settings 422. The aggressiveness settings 422 are used by the optimizer 416 to determine how aggressively to apply optimization policies 418 to move virtual machines among the physical hosts 440 of the cloud 430.

Figure 5:
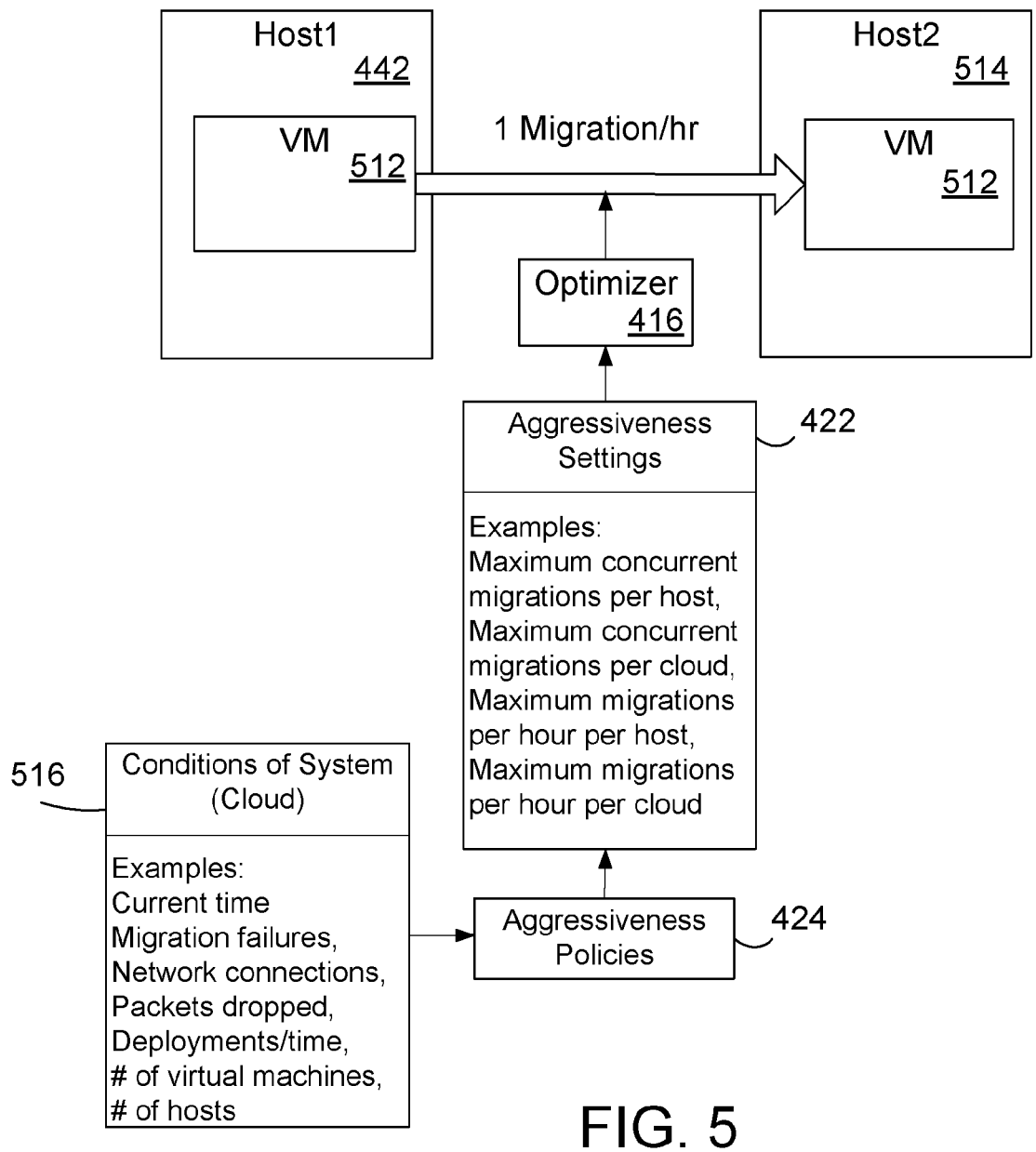
FIG. 5 is a block diagram that illustrates a simplified example of dynamically changing the aggressiveness of optimization of the placement of virtual machines on host computers.

FIG. 5 is a block diagram that that illustrates a simplified example of dynamically changing the aggressiveness of optimization for placement of virtual machines on host computers. In this example, the optimizer 416 has determined to optimize host1 442 by moving a virtual machine 512 to host2 514 using the optimization policies 418 (FIG. 4) in the manner known in the prior art. The APM 350 (FIG. 4) provides aggressiveness setting 422 to the optimizer 416 to control the aggressiveness of optimization. In this example, the aggressiveness settings 422 indicate to the optimizer 416 to limit movement of virtual machines between hosts to one migration per hour. The APM 350 processes the aggressiveness policies 424 to set or modify the aggressiveness settings 422. The aggressiveness policies 424 indicate how to set the aggressiveness settings 422 depending on system conditions 516 as described further below. The APM 350 monitors the system conditions 516 to dynamically change the aggressiveness settings 422 according to the aggressiveness policies 424. When the aggressiveness policies 424 and changing system conditions 516 indicate the aggressiveness settings should be changed, updated aggressiveness settings 422 are sent to the optimizer 416. The updated aggressiveness settings may then indicate a new maximum for moving virtual machines between hosts. For example, the new maximum for moving virtual machine hosts may be changed to five or ten migrations per hour (not shown) instead of 1 migration per hour previously.

The aggressiveness settings 422 described above with reference to FIG. 4 are determined by the APM 350 using one or more aggressiveness policies 424 set up by the system administrator 412. The aggressiveness policies 422 describe an aggressiveness setting or a change to an aggressiveness setting depending on one or more system conditions 516 as shown in FIG. 5. Examples of system conditions that may be used include time based conditions such as time of the day, day of the week, holidays, etc. Other conditions that can be used may be related to the loading condition of hardware and software in the system. For example, these conditions may include the number of migration failures in the recent past, the number of network connections for a physical host, the number of packets dropped on a network connection, number of deployments in the last N minutes, the total number of virtual machines in the cloud, and the total number of hosts in the cloud, etc.

As introduced above, the APM 350 (FIG. 4) sends aggressiveness setting 422 to the optimizer 416. The aggressiveness settings 422 may include one or more settings that indicate restrictions on the optimizer in a given time period or for concurrent operations. For example, the setting may include a maximum number of concurrent migrations per host, a maximum number of concurrent migrations per cloud, a maximum number of migrations per host per hour, and a maximum number of migrations per cloud per hour. Thus the aggressiveness of the system or cloud could be reflected in a 4-tuple as follows:

aggressiveness=max_concurrent_migrations_per_host,
   max_concurrent_migrations_per_cloud,
   max_migrations_per_hour_per_host,
   max_migrations_per_hour_per_cloud.

Each of the aggressiveness settings in the 4-tuple above may have a numerical value such that at one particular time the aggressiveness settings could be represented as follows:
   aggressiveness=10, 100, 50, 1000.

The aggressiveness policies 424 may be in the form of an expression or a function that returns a set of values for a number of aggressiveness settings depending on one or more system or cloud conditions 510 as shown in FIG. 5. For some examples, aggressiveness policies may be as follows:

If the time of day="peak hours" then set the values of the aggressiveness setting to aggressiveness=5, 50, 25, 500.

If the time of day="non-peak hours" then set the values of the aggressiveness setting to aggressiveness=10, 100, 50, 1000.

If the number of migration failures in the last 2 hours is greater than 1, then set the values of the aggressiveness setting to aggressiveness=1, 10, 5, 25.

If the number of migration failures in the last 2 hours is zero, then set the values of the aggressiveness setting to aggressiveness=10, 100, 50, 1000.

Alternatively, instead of setting the aggressiveness settings to a specific value, the aggressiveness policies may modify the current values of the aggressiveness settings and set a new value based on the cloud conditions and the previous aggressiveness settings. For some examples, aggressiveness policies may be as follows:

If the number of migration failures in the last 2 hours is greater than 1, then set the values of the aggressiveness setting to ½ of their current value.

Set the max_concurrent_migrations_per_host=8−
   (0.5*number_of_recent_migration_failures)−
   (0.05*number_of_recent_vm_deployments)

Set the
   max_concurrent_migrations_per_cloud=0.6*max_
   concurrent_migrations_per_host*(number_of_
   hosts+1)

Set the max_migrations_per_hour_per_host=16+
   (0.5*number_of_VMs)−(0.25*number_of_re-
   cent_migration_failures)

Set the max_migrations_per_hour_per_cloud=
   0.7*max_migrations_per_hour_per_host*(num-
   ber_of_hosts+1)

Figure 6:
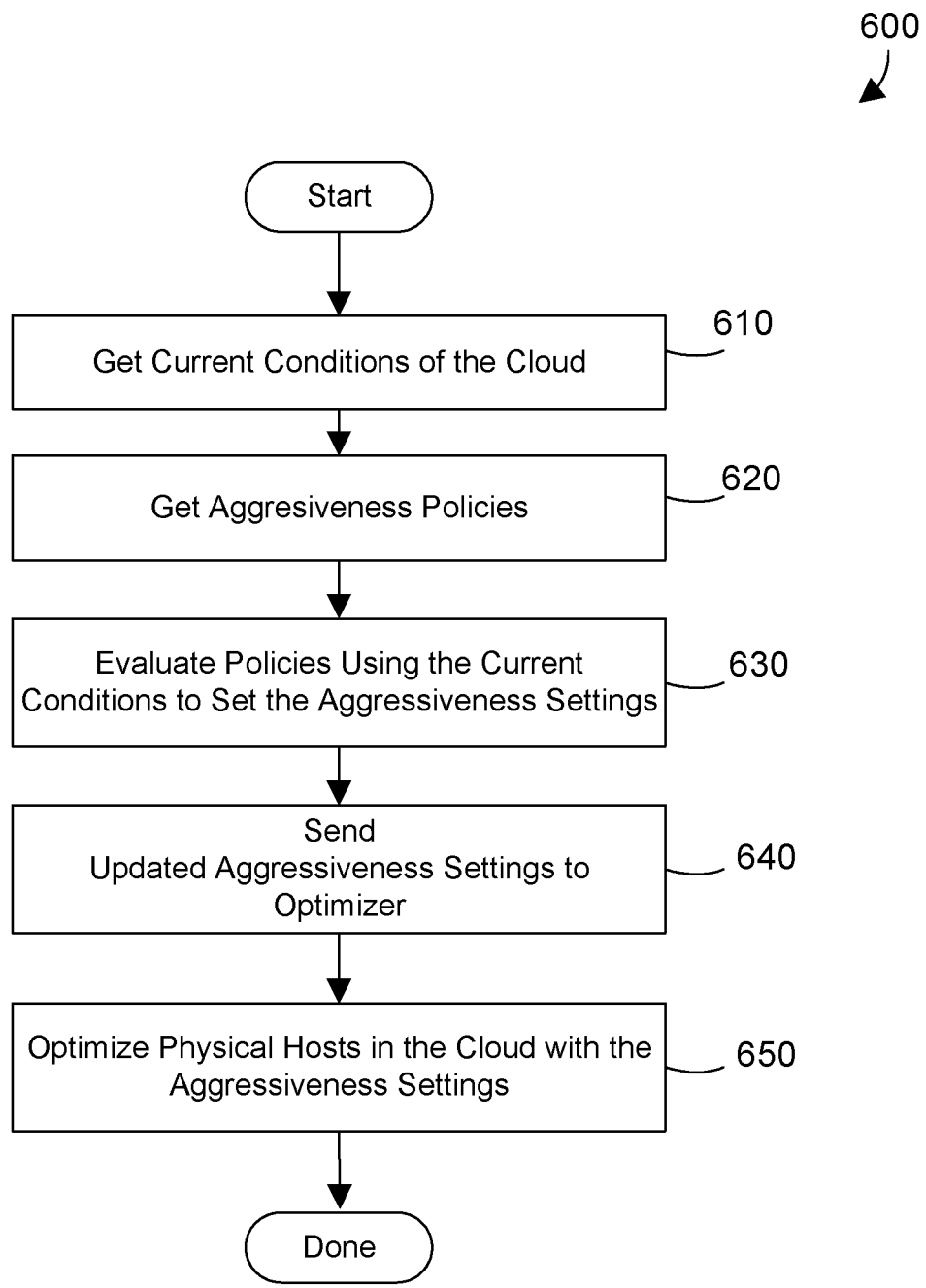
FIG. 6 is a flow diagram of a method for dynamically changing aggressiveness in optimizing placement of virtual machines on physical hosts as described herein.

FIG. 6 illustrates a flow diagram of a method 600 for dynamic aggressiveness in optimizing placement of virtual machines on physical hosts. The method 600 is presented as a series of steps performed by a computer software program such as the aggressiveness policy mechanism 350 described above. First, get the current conditions of the cloud (step 610). Get the aggressiveness policies (step 620). Evaluate the policies using the current conditions in step 610 to set the aggressiveness settings (step 630). Send updated aggressiveness settings to the optimizer (step 640). Optimize loading of the physical hosts with the aggressiveness settings (step 650). The method is then done.

Figure 7:
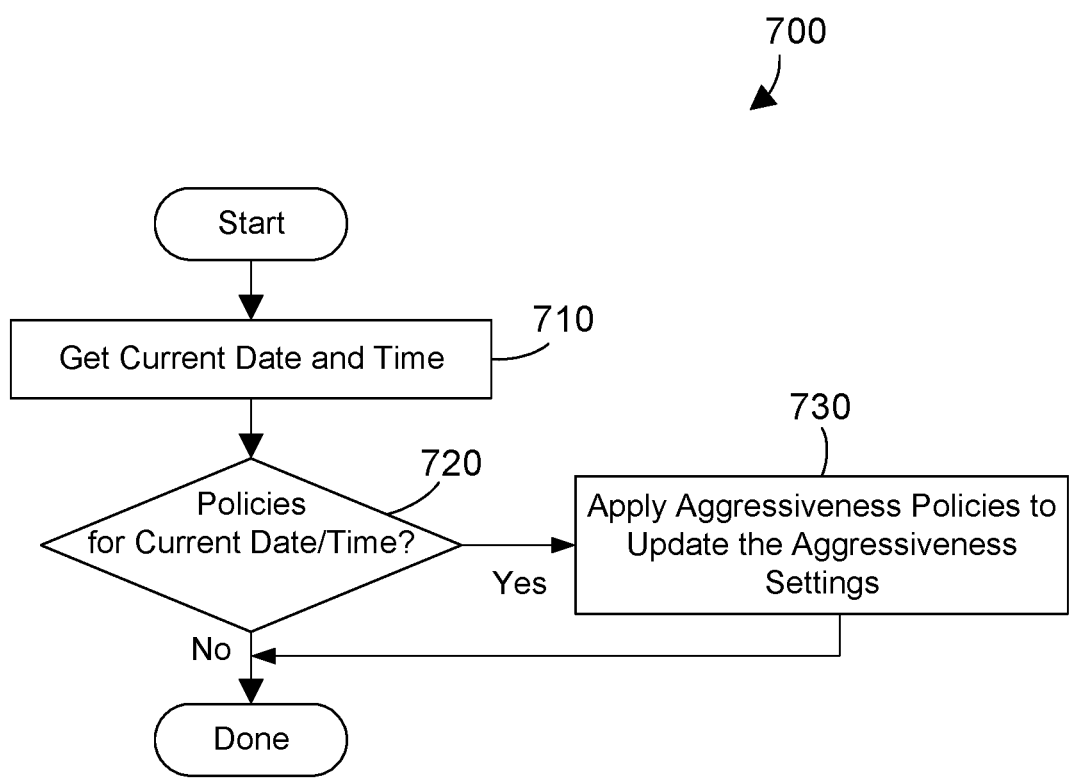
FIG. 7 is a flow diagram of an example method for step 630 in FIG. 6.

Referring now to FIG. 7, a flow diagram shows method 700 that is an exemplary method for performing step 630 in method 600 for dynamically changing aggressiveness in optimizing placement of virtual machines on physical hosts. The method 700 is presented as a series of steps performed by a computer software program such as the aggressiveness policy mechanism 350 described above. First, get the current date and time (step 710). If there are polices for the current date and time (step 720=yes) then apply the aggressiveness polices to update the aggressiveness settings (step 730) and the method is done. If there are no polices for the current date and time (step 720=no) then the method is done.

The claims and disclosure herein provide an apparatus and method for dynamically changing the aggressiveness in which the optimizer optimizes placement of virtual machines on physical hosts to allow more efficient and varied optimization.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
at least one processor;
a memory coupled to the at least one processor;
a first physical host with a virtual machine and a second physical host coupled to the apparatus via a network;
an optimizer for optimizing the loading of virtual machines on host computers;
an aggressiveness policy mechanism residing in the memory and executed by the at least one processor that provides dynamically changing the aggressiveness settings for loading the virtual machines based on aggressiveness policies that indicate to change aggressiveness settings depending on system conditions comprising: number of migration failures in the past, number of network connections for a physical host, the total number of virtual machines in the system, wherein the aggressiveness settings comprise: a maximum number of migrations per host per hour, and a maximum number of concurrent migrations per host; and
wherein the optimizer dynamically changes the aggressiveness of optimization as indicated by the dynamically changing aggressiveness settings.

2. The apparatus of claim 1 wherein the aggressiveness policy mechanism is part of a management layer of a cloud computing environment and wherein the physical host computer systems are part of a cloud computing environment.

3. The apparatus of claim 1 wherein the aggressiveness policy mechanism allows a system administrator to define one or more aggressiveness policies that are used to determine the aggressiveness settings.

4. The apparatus of claim 1 wherein the aggressiveness policies indicate to change at least one aggressiveness setting of the aggressiveness settings depending on at least one system condition.

5. The apparatus of claim 4 wherein the system conditions further comprise: the number of packets dropped on a network connection, number of deployments in the past, and the total number of hosts in the system.

6. The apparatus of claim 1 wherein the aggressiveness settings further comprise: a maximum number of migrations per cloud per hour, and a maximum number of concurrent migrations per cloud.

7. The apparatus of claim 1 wherein the aggressiveness policy mechanism periodically evaluates the aggressiveness policies to dynamically update the aggressiveness settings used by the optimizer to determine whether to migrate the virtual machine to another physical host.

8. The apparatus of claim 1 wherein the optimizer optimizes the system by moving the virtual machine from the first physical host to the second physical host.

9. The apparatus of claim 1 wherein the aggressiveness policies indicate to change at least one aggressiveness setting depending on at least one system condition and depending on previous aggressiveness settings used by the optimizer.

10. The apparatus of claim 1 wherein aggressiveness policies are a function that when evaluated identify one or more aggressiveness settings.

11. A program product comprising:
an optimizer for optimizing loading of virtual machines on physical host computers;
an aggressiveness policy mechanism that dynamically changes aggressiveness settings for loading the virtual machines based on aggressiveness policies that indicate to change aggressiveness settings depending on system conditions comprising: number of migration failures in the past, number of network connections for a physical host, the total number of virtual machines in the system, wherein the aggressiveness settings comprise: a maximum number of migrations per host per hour, and a maximum number of concurrent migrations per host,
wherein the optimizer dynamically changes the aggressiveness of optimization as indicated by the dynamically changing aggressiveness settings; and
a computer-readable storage medium bearing the optimizer and the aggressiveness policy mechanism.

12. The program product of claim 11 wherein the aggressiveness policy mechanism is part of a management layer of a cloud computing environment and wherein the physical host computer systems are part of a cloud computing environment.

13. The program product of claim 11 wherein the aggressiveness policy mechanism allows a system administrator to define one or more aggressiveness policies that are used to determine the aggressiveness settings.

14. The program product of claim 11 wherein the aggressiveness policies indicate to change at least one aggressiveness setting of the aggressiveness settings depending on at least one system condition.

15. The program product of claim 14 wherein the system conditions further comprise: the number of packets dropped on a network connection, number of deployments in the past, and the total number of hosts in the system.

16. The program product of claim 11 wherein the aggressiveness settings further comprise: a maximum number of migrations per cloud per hour, and a maximum number of concurrent migrations per cloud.

17. The program product of claim 11 wherein the aggressiveness policy mechanism periodically evaluates the aggressiveness policies to dynamically update the aggressiveness settings used by the optimizer to determine whether to migrate the virtual machine to another physical host.

18. The program product of claim 11 wherein the optimizer optimizes the system by moving the virtual machine from the first physical host to the second physical host.

19. The program product of claim 11 wherein the aggressiveness policies indicate to change at least one aggressiveness setting depending on at least one system condition and depending on previous aggressiveness settings used by the optimizer.

* * * * *